Jan. 1, 1929.  
N. Y. TROIDL  
1,696,988  
EDUCATIONAL DEVICE  
Filed Sept. 17, 1926 2 Sheets-Sheet 1
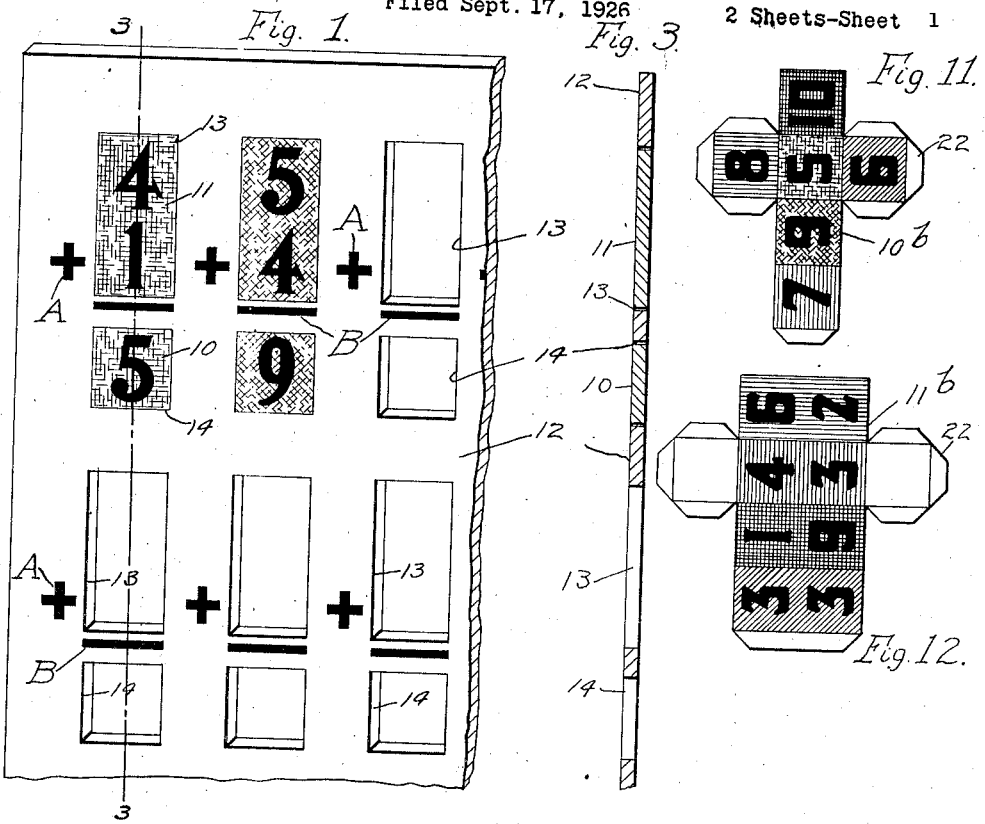
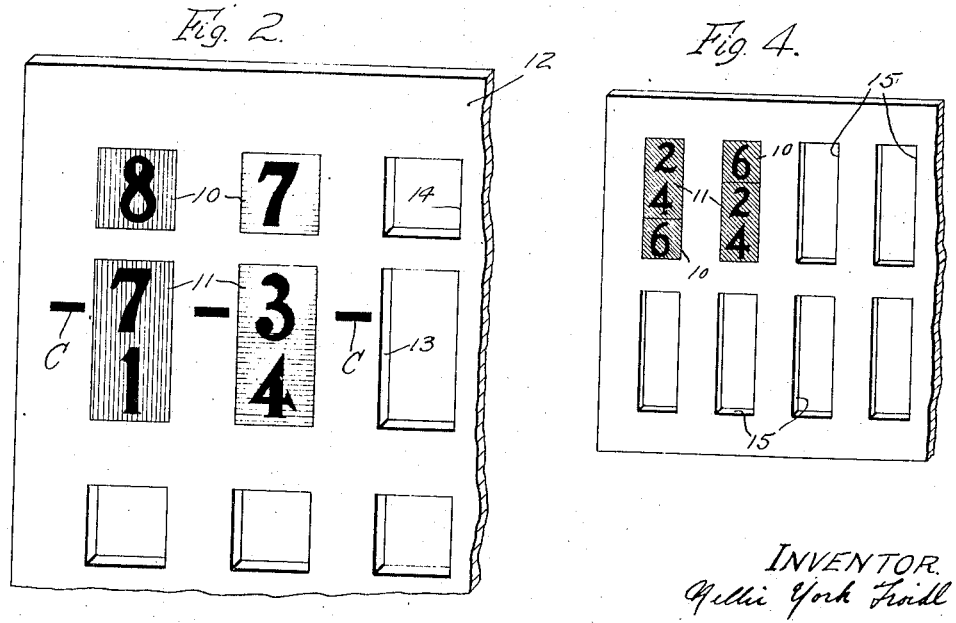
INVENTOR.  
Nellie York Troidl  
by Parker & Prochnow  
ATTORNEYS.

Jan. 1, 1929.
N. Y. TROIDL
1,696,988
EDUCATIONAL DEVICE
Filed Sept. 17, 1926
2 Sheets-Sheet 2
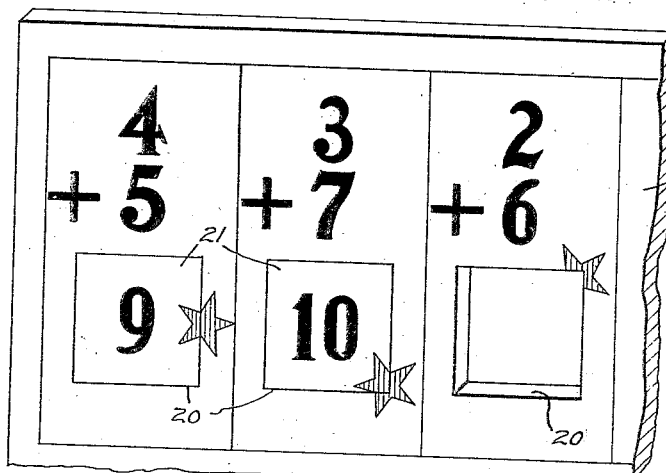
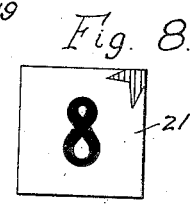
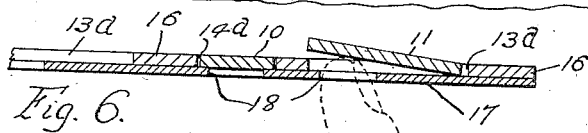
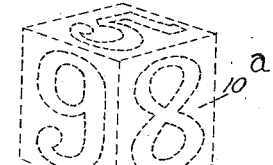
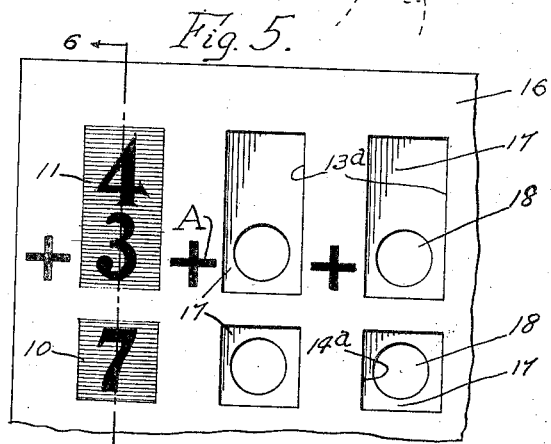
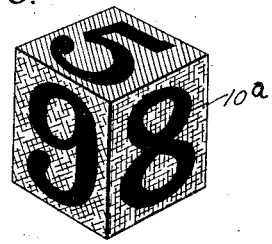
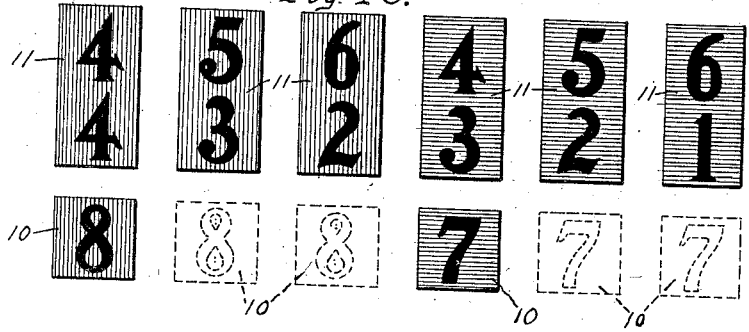
INVENTOR.
Nellie York Troidl
by Parker & Prochnow
ATTORNEYS.

Patented Jan. 1, 1929.

1,696,988

UNITED STATES PATENT OFFICE.

NELLIE YORK TROIDL, OF NIAGARA FALLS, NEW YORK.

EDUCATIONAL DEVICE.

Application filed September 17, 1926. Serial No. 136,010.

This invention relates to educational appliances or devices for use in the instruction of children, and particularly to self teaching devices by which the child of its own initiative learns to solve problems such as in spelling and arithmetic. The average child takes great delight in almost any kind of mechanical activity and if its delight in mechanical activity can be utilized to hold its interest while being taught, the child may progress in learning through its own efforts. Such self-teaching materials or devices are particularly valuable in connection with the modern educational systems where large classes are necessarily given to individual teachers.

An object of the invention is to provide an improved educational device with which the instruction of children in educational subjects such as spelling, reading and arithmetic is facilitated. More particularly an object is to provide an improved device with which the interest of the child in its use will be maintained; which will be an excellent supplementary assistance to public school teachers or teachers of young children, with which a large number of different problems may be worked out with a relatively simple and compact device, and which will be compact and relatively inexpensive.

Various other objects and advantages will be apparent from the following description of several embodiments of the invention, and the novel features of the invention will be particularly pointed out hereinafter in connection with the appended claims.

In the accompanying drawings,

Fig. 1 is a perspective illustrating one embodiment of the invention as used for instruction in problems in arithmetic, the face illustrated being used to teach addition;

Fig. 2 is a perspective of the reverse face of the same as used for instruction in subtraction;

Fig. 3 is a sectional elevation of the same, with the section taken approximately along the line 3—3 of Fig. 1;

Fig. 4 is a perspective illustrating still another embodiment of the invention;

Fig. 5 is a front elevation illustrating still another embodiment of the invention;

Fig. 6 is a sectional elevation of the same, with the section taken approximately along the line 6—6 of Fig. 5;

Fig. 7 is a perspective illustrating still another embodiment of the invention;

Fig. 8 is a perspective of one of the blocks used in the embodiment of Fig. 7;

Fig. 9 is a perspective of two elements which constitute still another embodiment of the invention;

Fig. 10 illustrates in elevation a group of elements or blocks which form a part of the invention in Figs. 1 to 6, and which may in themselves form an embodiment of the invention;

Fig. 11 is a plan of a paper blank from which the master cube may be formed by folding and gluing the same; and Fig. 12 is a plan of a paper blank from which one of the other blocks or cubes may be formed by folding and gluing.

In the embodiments of the invention illustrated in Figs. 1, 2, 3, and 10, two sets of multi-faced blocks 10 and 11 are provided. The blocks 10 may constitute what are known as master blocks, in that they carry certain information which may be used in some problems as master or determining blocks. The faces of all of the blocks 10 and 11 bear distinguishing characteristics by which they may be identified or grouped, and for such distinguishing characteristics different colors have been found to be very satisfactory, because a child very early and easily learns to distinguish and identify colors, long before they are able to perform problems in arithmetic, reading or spelling. Accordingly, the faces of the blocks may be given different colors, so that they may be grouped in any desired relation by merely matching the colors or arranging them according to colors in any desired order of sequence or relationship.

In Fig. 10, for example, the blocks 11 in the group of three at the left of the figure are shown as bearing the red color, and the three at the right are shown as being colored blue. The master blocks 10 are also provided with similar or related colors and the child is instructed to match the colors of the blocks 10 and 11, two in each set, or group them according to related colors. Thus, the child by bringing a block 10 into proximity to a block 11 of the same or related color will have two elements which cooperate to teach a particular problem. The block 10 carries upon each face, for example, a number, and the block 11 having the same or related color carries upon each of its faces two or more numbers which have a definite relation to the number found upon the block 10 bearing the same or a related color. Thus, referring to Fig. 10, the first block 11 at the left bears upon its exposed face the numerals four and four above one another, and the numeral upon the face of the block 10 having the same or related color bears the numeral eight. When the master block 10 is brought below that block 11 a problem in arithmetic will be illustrated, to the effect that four plus four equals eight, the number found upon the master block 10. Similarly since other numbers may also be combined by addition to produce the sum of eight, other blocks 11, such as shown in the second and third from the left of Fig. 10, may bear numerals whose sum is eight, such as numerals five and three, and six and two.

The master block 10 bearing the numeral eight and which has a color related to or the same as the blocks 11 bearing the numerals five and three, and six and two, may be placed similarly at the end of and below those blocks, as shown by the dash lines in Fig. 10, instead of being related solely to the extreme left hand block 11. Thus by bringing the master block 10 into proper relation to any one of these three blocks 11, different mathematical problems having the same answer will be indicated and solved. Similarly at the three right hand groups of Fig. 10, the master block 10 showing the numeral 7 when brought below the other blocks 11 having similar or related colors will indicate that four plus three equals seven, or five plus two equals seven or six plus 1 equals seven, depending upon the particular block 11 under which the master block 10 bearing the numeral seven is disposed. The other possible positions of this block 10 are shown in dash lines at the two right hand groups in Fig. 10. These group combinations may be multiplied at will, and different distinguishing colors or characteristics provided to assist a child in matching up the blocks in the sets which indicate the problems and solutions in arithmetic or other educational subjects such as spelling or reading.

If one desires to use such blocks to perform problems in subtraction for example, the master block 10 will be disposed above the other blocks 11 having the same or related colors, and then the sum at the top will act as the minuend, the uppermost number on the other block 11 with which it is associated will indicate the subtrahend, and the lower number on the block 11 will indicate the remainder. Thus two problems, one in subtraction and the other in addition may be performed by each pair of blocks 10 and 11, and the same master block 10 may be used for a number of other blocks 11.

While these groups of blocks 10 and 11 may be used by themselves and arranged in desired combinations to indicate problems and their solutions, it is frequently desirable, particularly when the devices are used with beginners, to have some mechanical aid to assist the child in grouping the blocks properly with respect to one another. Accordingly referring to Figures 1, 2 and 3, I may provide a sheet 12 having therein a plurality of apertures 13 and 14 which are arranged endwise to one another as illustrated, and of sizes to receive the blocks 10 and 11. For example the apertures 14 are of a size and shape to receive the master blocks 10, and the apertures 13 are of a size and shape to receive the other blocks 11.

One face of such a sheet is shown in Fig. 1, in which the larger openings 13 are shown as uppermost and the plus sign A indication on that face shows that that face is intended for use when addition is to be performed. These faces may also be provided with summation bars B between the apertures 13 and 14 of each group which indicate that the upper two members are to be added and that the lower member will indicate the sum. Thus in the left hand group of Fig. 1, the blocks 10 and 11 are properly grouped with identical colors, that is, the blocks 10 and 11 having identical colors are fitted into the apertures 13 and 14, and these grouped blocks indicate a problem in addition, the upper block 11 bearing the numerals 4 and 1, and the lower block bearing the numeral 5, thus indicating that four plus one equals five. Similarly in the second group from the left, other blocks 10 and 11 are arranged in the apertures 13 and 14 and the numerals indicated upon these two blocks represent a problem in which 5 plus 4 equals 9. The child may similarly fill the other apertures 13 and 14 of the sheet with the blocks, indicating other problems and their solutions.

To preform problems in subtraction the child turns the card or sheet so as to expose the reverse face which is shown in Fig. 2, and the device is inverted so that the smaller apertures 14 will appear uppermost. Thus when the blocks are now fitted into the apertures the upper blocks 10 will indicate the minuend, the upper numeral on the lower block 11 will represent the subtrahend, and the lowermost numeral will indicate the remainder. It is desirable to indicate by minus signs C on this face of the sheet, that it is this face which is used for subtraction, and preferably this minus sign may be put adjacent the upper numeral and the lower block so that one readily understands that the two numbers when subtracted will equal the remainder shown by the lower numeral of the particular block 11 of any group. After the card or sheet has been used until all the apertures are filled, the child may remove the blocks from the apertures and start all over again, with the same or different set of blocks.

In Fig. 4 the same sets of blocks may be used, but instead of having separate apertures 13 and 14, only a single set of apertures 15 may be used, and the blocks fitted therein with the master block 10 either lowermost or uppermost, depending upon whether addition or subtraction is to be performed. Such a situation is shown clearly in Fig. 4, the first left hand group of blocks indicating how the blocks are arranged for addition, and the second group from the left indicating how the same blocks are rearranged when they are to be used to indicate a problem in subtraction.

In Fig. 5 a very similar arrangement is illustrated, the sheet 16 being provided with openings 13$^a$ and 14$^a$ as in Figures 1-3, but in addition, a thin sheet or backing 17, such as of paper or knitted or woven cloth is secured against the reverse face of the blocks 10 and 11 entirely through the apertures. Obviously in such a case a separate sheet is required for addition and a separate sheet for subtraction, it being less desirable to use the same sheet to indicate both addition and subtraction as was the case in Figs. 1 to 3. In order to assist a child, however, in removing the blocks after use, the sheet 17 may particularly, when formed of paper, be provided with a plurality of apertures 18 which are large enough to permit of the insertion of an object such as one finger, the apertures are not necessary when the backing is made of cloth. Thus, in Fig. 6, the dash lines indicate how one finger is inserted through the apertures 18 to dislodge the blocks 10 and 11 from the apertures 13$^a$ and 14$^a$ of the form sheet.

In Figs. 7 and 8 a somewhat similar arrangement is indicated, except that one set of numerals may be provided upon the card and the block which is fitted in an aperture of the card carries the other number. A sheet 19 is provided with a plurality of apertures 20 which may be arranged in rows along the same, and above each aperture one places a problem to be solved, and the blocks 21, see Fig. 8, which are of a size and shape to just fit the apertures 20 are provided with the answers to the problems that are placed upon the sheet 19. In order to assist a child in classifying and properly arranging the blocks 21, the portion of the card bearing the problem and the blocks bearing the correct solution to the problem have suitable identifying or classifying characteristics such as identical or related colors, or as shown in Figs. 7 and 8 suitable matching characters may be provided jointly upon the proper blocks 21 and the sheet 19.

In the particular illustration a star is disposed partially on the proper block and partially on the sheet 19, the stars being arranged at different positions around the apertures 20 for the different problems, so that half of each star will be carried by the block and the other half upon the sheet 19 adjacent the aperture 20. Thus when the blocks 21 are inserted into the apertures 20 if the star sections or other classifying features match up as shown at the left in Fig. 7, one will know that the proper answer blocks are in position, and that the numerals or characters borne thereby indicate the correct answer to the problem appearing immediately above it. If the wrong block is inserted in the wrong aperture 20, then the star sections or classifying features will not match up, and one will know immediately that that block is improperly placed. While the problems indicated are those of addition, it will be understood, of course, that problems in subtraction, spelling or reading may also or instead be provided thereon.

In Fig. 9 a somewhat similar arrangement is illustrated except that the multi-faced blocks are in the form of cubes or elongated blocks such as parallelopipeds, these blocks being designated as 10$^a$ and 11$^a$ respectively, because they correspond to the blocks 10 and 11 of Figs. 1 to 6, and 10. The blocks 10 and 11 of Figs. 1 to 6 and 10 may be formed by stamping them from sheets of material and, of course, have only two faces which may carry problems or answers, but in Fig. 9 where the objects have four or more faces which may be used, obviously the number of problems which may be indicated and solved with the same number of blocks is very greatly increased. Thus the cubes 10$^a$ have six faces which may carry master numerals for use with several sets of the longer blocks 11$^a$. The blocks 10$^a$ and 11$^a$ in use are arranged end for end as shown in Fig. 9, for example, and the colors are matched or arranged in a desired relation so that the numerals or characters carried by the related faces will indicate a problem and its solution. Preferably the numerals or characters upon the successive faces are not arranged in the same order of related sequence as will be apparent from Fig. 9, so that after a child has matched one set of faces it cannot by merely rotating the objects in the same order obtain the next problem and its solution, but will be compelled to rearrange the objects and bring them into a different relation.

The master cube may be placed at either end of the longer block depending upon the character of the problem to be performed. When the two blocks are arranged as shown in full lines in Fig. 9, that is, with the master cube at the lower end of the block 11$^a$, the numeral on the master block will indicate the sum of the two numbers on the corresponding face of the other block, and the numbers will all be arranged in proper position for addition. To indicate problems in subtraction, the master cube 10$^a$ is shifted to a point at the other end of the block 11$^a$, as shown by dotted lines in Fig. 9, and when in that position a problem in subtraction will be indicated. For example, when the blocks are arranged as shown in this figure, they indicate that 9 minus 4 equals 5, as the particular problem in subtraction. Similarly, by grouping the faces of the blocks according to their related characteristics, different problems in addition and subtraction may be performed.

The large blocks, such as shown in Fig. 9, may be formed of solid material such as wood for the more durable sets, but for an inexpensive set, these blocks 10$^a$ and 11$^a$ may be formed of cheap material, such as paper and cardboard, which is first stamped out and printed so as to form blanks shown in Figs. 11 and 12. In Fig. 11 the blank 10$^b$ corresponds to the master cube 10$^a$ and the blank 11$^b$ corresponds to the other block 11$^a$. These blanks are of such shape that when folded along the junctions between the faces, they will form hollow blocks similar to those shown in Fig. 9, and certain parts of the blanks may be provided with tabs 22 which may carry an adhesive, so that when the blanks are folded, these tabs or tongues will fold against other parts of the blank and may be glued or otherwise secured thereto to hold the blocks in shape. Such blanks have the advantage that they may be formed by stamping and printing at a very low cost, and may be shipped and stored flat and then folded into the blocks by the purchaser or child. The use of such hollow blocks is the same as with the blocks of Fig. 9. If desired, one may provide solid forms over which the blanks may be folded and which may be enclosed within the folded blanks to give them stiffness, weight and rigidity.

It will be understood that while I have illustrated and described common forms for a plurality of problems, a separate form for each single problem may be employed, if desired. While the invention has been described as used for instruction of problems in addition and subtraction, it will be understood that it may be used equally well for other problems, such as problems in spelling and for problems in division and multiplication. When the numbers upon related faces are properly selected, the number upon the master block or object, such as 10, 10$^a$ and 10$^b$ will represent a product, and the numbers upon related faces of the other block, such as 11, 11$^a$ and 11$^b$ will represent the two numbers which when multiplied together will equal the product. When the product is arranged below the block carrying the two numbers to be multiplied, a problem and answer in multiplication will be illustrated. When the master block is shifted to the other end, corresponding to the position shown by dotted lines in Fig. 9, then the product represents a number which when divided by either of the other numbers upon the corresponding face of the adjacent block will equal the other number carried by the same face of the same block.

From the foregoing it will be clear that a young child may, by arranging blocks in various desired combinations, and the matching of distinguishing characteristics, or by the bringing of the faces having related characteristics into view in a desired order, provide an indication of a problem and its solution. A child likes to arrange and match objects, and very early learns to identify characters and group them. This invention utilizes that inclination on the part of young children and stimulates them in solving problems, thus holding their interest and inducing them to study correctly of their own desire, and without the necessity of having close supervision of an instructor. Such devices are very much in the nature of a self teacher and aid the children to study effectively. The devices may be used not only to teach addition and subtraction, but also multiplication and division, and may also be employed to teach other problems, such as problems in sight reading and spelling.

It will be obvious that various changes in the details, which have been herein described and illustrated in order to explain the nature of the invention as embodied in different forms, may be made by those skilled in the art within the principle and scope of the invention as expressed in the appended claims.

Claims:—

1. In an educational device, a plurality of multi-faced individual objects groupable in any desired combination, of at least two objects in each group, said objects having faces classified according to visible characteristics by which they may be identified, distinguished and grouped in sets, the objects of each set having faces with characteristics related to one another, and different from the other sets, the faces of each set with related characteristics also bearing selected and related character representations, whereby when the objects of each set are brought into proximity to one another in a selected manner, with the faces bearing related characteristics in view, an educational problem and answer will be displayed by the character representations of that set.

2. In an educational device, a plurality of individual objects groupable in any combinations of two or more objects, said objects having faces with distinguishing visual characteristics by which the faces may be identified and grouped in sets by related grouping of the objects, the faces in any set with related characteristics also all bearing character representations relating to educational problems and answers, whereby when a set is formed by grouping objects with faces having related identifying characteristics in view, the character representations upon the visible faces of that set will together represent an educational problem and its answer.

3. In an educational device, a plurality of individual objects groupable in any desired combination, with at least two objects in each group, said objects having faces with distinguishing visual characteristics by which the faces may be identified and grouped in sets by selected grouping of the objects, the faces in any set with related characteristics also all bearing character representations relating to educational problems and answers, whereby when a set is formed by grouping objects with faces having related identifying characteristics in view, the character representations upon the visible faces of that set will together represent an educational problem and its answer, certain of the objects bearing master character representations which may be employed in a plurality of different combinations with other of the objects.

4. In an educational device, a plurality of individual objects groupable in any desired combination, with at least two objects in each group, said objects having faces with distinguishing visual characteristics by which the faces may be identified and distinguished for grouping in sets, certain of the objects bearing upon their faces master numerals representing the solution of a mathematical problem, and other of the objects bearing upon their faces a group of numerals representing mathematical problems, the numerals upon faces of the objects of any group having related characteristics together indicating a problem and answer in arithmetic.

5. In an educational device, a plurality of individual objects groupable in any desired combination, with at least two objects in each group, said objects having faces with distinguishing visual characteristics by which the faces may be identified and distinguished for grouping in sets, certain of the objects bearing upon their faces master numerals representing the solution of a mathematical problem, and other of the objects bearing upon their faces a group of numerals representing mathematical problems, the numerals upon faces of the objects of any group having related characteristics together indicating a problem and answer in arithmetic, and a form having means to assist in the proper grouping of the objects for indicating problems and answers.

6. In an educational device, a plurality of individual objects groupable in any desired combination, with at least two objects in each group, said objects having faces with distinguishing visual characteristics by which the faces may be identified and distinguished for grouping in sets, certain of the objects bearing upon their faces master numerals representing the solution of a mathematical problem, and other of the objects bearing upon their faces a group of numerals representing mathematical problems, the numerals upon faces of the objects of any group having related characteristics together indicating a problem and answer in arithmetic, and an apertured form in the apertures of which the objects may be grouped in proper relation to one another for indicating the mathematical problems and answers.

7. In an educational device, a plurality of individual objects groupable in any desired combination with at least two objects in each group, said objects having faces with distinguishing visual characteristics by which the faces may be identified and distinguished for grouping in sets, certain of the objects bearing upon their faces master numerals representing parts of problems in arithmetic, and other of the objects bearing upon their faces a group of numerals representing parts of problems in arithmetic, the numerals upon faces of the objects of any group having related characteristics together indicating one problem in arithmetic when the object with the master numeral is placed at one end of the group, and a different but related problem in arithmetic when the same block with the master numeral is placed at the opposite end of the group.

8. In an educational device, blanks having shapes which may be folded into hollow blocks and bearing upon their exposed faces distinguishing visual characteristics by which the faces may be identified and distinguished for grouping in sets, the faces also bearing numerals representing parts of problems in arithmetic, the numerals upon one of the blanks representing parts of problems in arithmetic, and the number or numbers carried by the other blank representing remainders of problems in arithmetic, the numerals upon related faces of the blanks together indicating one complete problem in arithmetic when one block is at one end of the group, and a different but related problem when the same block is placed at the opposite end of the group.

9. In an educational device, blanks formed of sheet material of a size and shape to be folded into hollow blocks and having the faces of the blanks which are exposed when folded into blocks provided with different visual characteristics by which the faces may be identified and distinguished for grouping in sets, and also bearing characters which when grouped according to related visual characteristics will indicate an educational problem and solution.

In testimony of the foregoing, I have signed my name hereto.

NELLIE YORK TROIDL.